United States Patent [19]

Persyk

[11] Patent Number: 4,481,419
[45] Date of Patent: Nov. 6, 1984

[54] ATTENUATION ZONE PLATE

[75] Inventor: Dennis E. Persyk, Barrington, Ill.

[73] Assignee: Siemens Gammasonics, Inc., Des Plaines, Ill.

[21] Appl. No.: 316,415

[22] Filed: Oct. 29, 1981

[51] Int. Cl.$^3$ .................. G01T 1/164; G21K 3/00
[52] U.S. Cl. .................................. 250/363 S; 378/2; 378/150; 378/159
[58] Field of Search .................. 378/2, 159, 150; 250/363 S, 505.1, 252.1

[56] References Cited

U.S. PATENT DOCUMENTS

| | | | |
|---|---|---|---|
| 2,871,367 | 1/1959 | Gournay | 378/150 |
| 3,011,057 | 11/1961 | Anger | 250/363 S |
| 3,660,664 | 5/1972 | Pasmeg | 378/159 |
| 3,755,672 | 8/1973 | Edholm et al. | 378/159 |
| 3,961,191 | 6/1976 | Stoner et el. | 378/2 |
| 4,107,730 | 4/1977 | Barrett | 250/363 S |
| 4,165,462 | 8/1979 | Macovski et al. | 250/363 S |
| 4,417,143 | 11/1983 | Haas et al. | 250/363 S |
| 4,419,577 | 12/1983 | Guth | 250/252.1 |

OTHER PUBLICATIONS

Dowdey, "Coded Apertures for Nuclear Medicine Imaging", Applied Radiology/NM, Jul.-Aug. 1977, pp. 145-169.

Primary Examiner—Alfred E. Smith
Assistant Examiner—Carolyn E. Fields
Attorney, Agent, or Firm—Karl F. Milde, Jr.

[57] ABSTRACT

An attenuation zone plate for coded-aperture imaging of a radiation source has mercury contained within a wedge-shaped chamber in a plastic housing. Reservoir and relief cavities facilitate filling the housing with mercury and accommodate changes in mercury volume. Lead plates positioned on the perimeter of the housing provide a field of view mask. In one embodiment, the housing cover pivots to vary the wedge angle. Advantages include greater facility in precision manufacturing and greater attenuation pattern flexibility.

12 Claims, 5 Drawing Figures

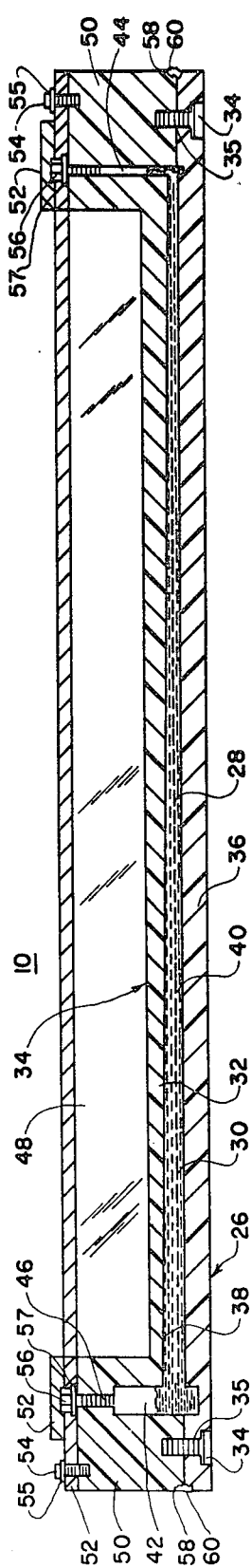
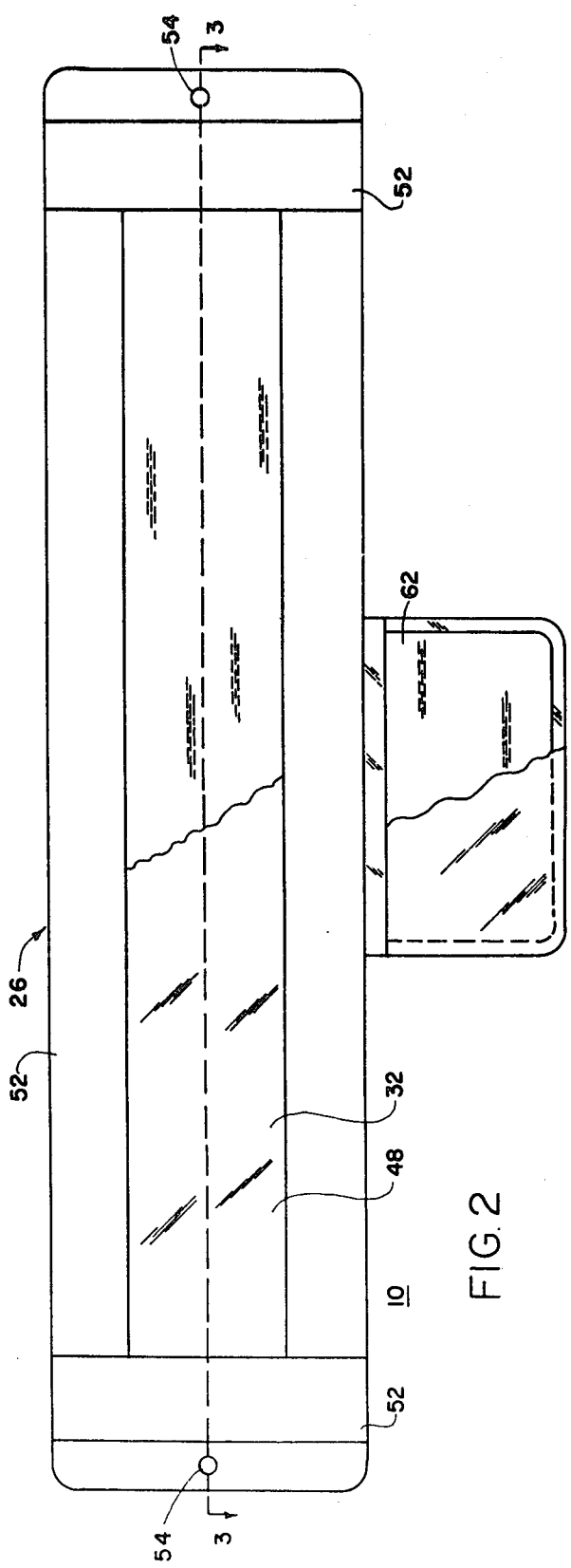
FIG. 3
FIG. 2

ATTENUATION ZONE PLATE

BACKGROUND OF THE INVENTION

1. Field of the Invention

This invention relates to coded apertures for nuclear medicine imaging in general, and in particular to coded apertures providing graded attenuation.

2. Description of the Prior Art

Coded-apertures are used with radiation detectors, as an alternative to collimators, as medical diagnostic tools for detecting the radioactivity of an object under investigation, such as for determining the distribution of a radioactive isotope absorbed by a human body organ. An example of a radiation detecting device to which the present invention finds application is the Anger-type scintillation camera, the basic principles of which are explained in U.S. Pat. No. 3,011,057.

Collimators are used with a radiation detecting device to define radiation transmitting channels between the source of radiation (e.g. a human body organ) and a transducer (e.g. a scintillation crystal) so that radiation emitted from spatial areas of the radiation source can be mapped to corresponding spatial areas of the transducer. Collimators comprise radiation transmitting apertures or channels separated from each other by radiation opaque walls or septa. They ensure that only those photons travelling parallel to the channels will be detected by the transducer and that other photons are rejected. In a collimator imaging system, the detector is used to obtain a two-dimensional presentation of the three-dimensional distribution of the radiation source. Collimator imaging systems may be adopted for emission computerized tomography (ECT) to detect the source distribution from a plurality of viewing positions as the detector head is caused to precess about the patient. (See, for example, the disclosure of the commonly-owned, copending patent application Ser. No. 273,446 of Haas, et al., filed June 15, 1981, now U.S. Pat. No. 4,417,143, entitled "Improved Apparatus for Driving a Radiation Detector".) A display is produced showing the radioactive distribution in the object of study along a number of parallel section imaging planes.

Coded-aperture imaging is used as an alternative to collimator imaging to obtain information about the distribution of a radiation source. In coded-aperture imaging, a coded aperture called an "attenuation zone plate" is placed between the radiation source and the transducer of the radiation detector to modulate rays emanating from each point on the source, without collimation, to form an encoded record of the three-dimensional spatial distribution of the source. The attenuation zone plate comprises a radiation attenuating coded-aperture pattern such as a pattern of holes formed in a thin lead sheet. The radiation emitted in all directions from a single point on the radiation source passes through the coded-aperture pattern and produces a modulated image on the detector transducer—the distributions from all points being superimposed and representing an encoded record of the three-dimensional spatial distribution of the radiation source.

As described in J. Dowdey, et al., "Coded Apertures for Nuclear Medicine Imaging", Applied Radiology/NM, July-August 1977, pages 145-169, the coded-aperture imaging process is a two-step procedure. The first step is the production of an encoded record on a detection medium through modulation or "shadow casting" of the radiation source using a coded aperture. The second step is the decoding of the encoded record to provide usable source distribution information. The Dowdey, et al. article illustrates the process by an example coded aperture consisting of a pattern of holes in a thin lead sheet which is placed parallel to the face of the detector, between the detector and the radiation source. Each point on the radiation source casts a shadow that is of the same size and shape, but which is centered at a different position on the detector. Points located at different distances from the aperture cast different-sized shadows. The encoded record is a composite of the shadows of the aperture cast by all points in the source distribution. Decoding of the encoded record produces a usable image (typically presented as a series of tomographic slices) of the three-dimensional distribution of the radiation source.

The specific configuration of the coded aperture depends on the specific application and the decoding system to be used. One type of attenuation zone plate (e.g. the thin lead sheet formed with a hole pattern discussed in the Dowdey, et al. article) has a radiation transmission function $T(x,y)$ having a value of one of the transparent points (the holes) and a value of zero at all other points. There are, however, graded attenuation zone plates (such as wedge-shaped plates or plates whose thickness varies sinusoidally) in which the transmission function $T(x,y)$ of the pattern varies in a specified manner between the values of zero (radiation opaque) to one (completely radiation transparent).

In order to develop precise information about the three-dimensional spatial configuration of a radiation source, great precision is required in the layout and manufacture of attenuation zone plates. The required precision can present formidable problems in manufacture, especially in the manufacture of graded attenuation zone plates. Conventional attenuation zone plates are made of lead, with graded attenuation when present being achieved through careful machining of the lead to different thicknesses. To achieve varying radiation transmissivity between zero and one, portions of the plate must be formed of lead which is extremely thin and gradations are difficult to achieve with high precision. Furthermore, conventional graded attenuation zone plates are not adjustable to selectively vary the characteristics of the radiation attenuating pattern characteristics of the plate. Production of adjustable plates made of lead is difficult to achieve.

SUMMARY OF THE INVENTION

It is an object of the present invention to provide an improved attenuation zone plate for use in coded-aperture imaging to encode the distribution of a radiation source onto a detecting medium.

It is a further object of the invention to provide an improved attenuation zone plate which is adjustable to selectively vary the characteristics of the radiation pattern of the plate.

In accordance with one aspect of the invention, an attenuation zone plate is provided which comprises a quantity of fluid radiation attenuating material contained within a radiation transmitting housing. The housing is shaped so that the fluid material is contained in the housing in the configuration of a radiation attenuation pattern for modulating the rays emitted from the radiation source in accordance with their spatial origin.

In a preferred embodiment, described in detail below, the fluid radiation attenuating material is mercury and the housing is a plastic body having a cover and a bottom frame relatively positioned to form a wedge-shaped chamber containing the mercury.

In another aspect of the invention, the housing of the attenuation zone plate includes means for changing the shape of the housing to vary the configuration of the radiation attenuating pattern.

In a modified embodiment, described below, the housing having a wedge-shaped fluid chamber includes means for varying the internal angle of the wedge. A reservoir cavity is incorporated into the fluid chamber to accommodate increases and decreases in the volume of fluid material needed to fill the wedge portion of the fluid chamber for different internal wedge angles. The reservoir also serves to accommodate expansion and contraction of the fluid due to temperature changes.

In a further aspect of the invention, the perimeter of the attenuation zone plate housing is covered with a radiation blocking material to provide a radiation absorbing mask which defines the useful field of view of the zone plate.

There have thus been outlined rather broadly certain objects, features and advantages of the invention in order that the detailed description that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carring out the purposes of this invention. It is important, therefore, that this disclosure be regarded as including all such equivalent arrangements that encompass the spirit and scope of the invention.

BRIEF DESCRIPTION OF THE DRAWINGS

Embodiments of the invention have been chosen for the purposes of illustration and description, and are shown in the accompanying drawings forming a part of the specification, wherein:

FIG. 2 is a top plan view of an embodiment of an attenuation zone plate in accordance with the invention;

FIG. 3 is a section view taken along the line 3—3 of FIG. 2;

Throughout the drawings, like elements are referred to by like numerals.

DESCRIPTION OF PREFERRED EMBODIMENTS

Figure 1:
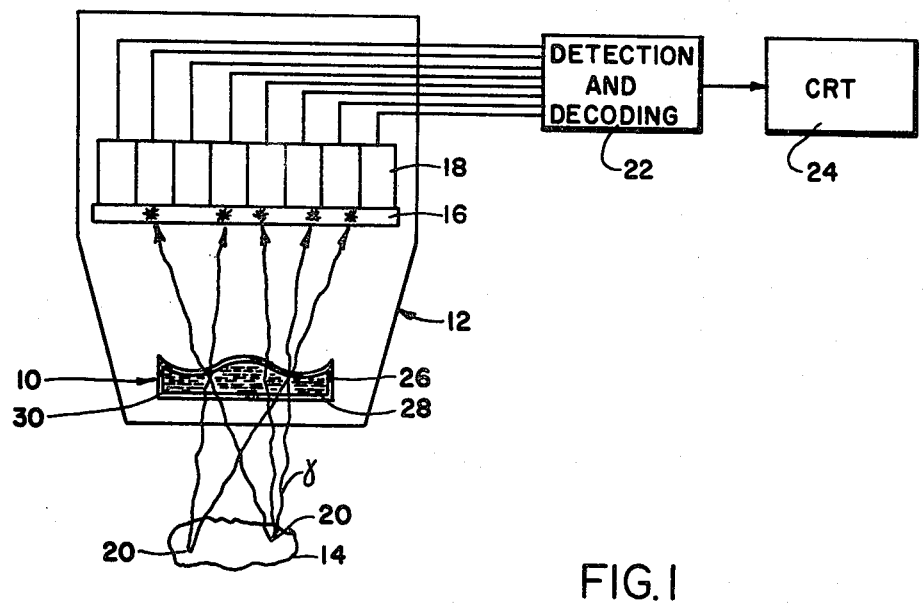
FIG. 1 is a schematic view of an Anger camera coded-aperture imaging system employing an attenuation zone plate in accordance with the present invention.

FIG. 1 shows an example of an attenuation zone plate 10 in accordance with the invention, in the environment of an Anger-type scintillation camera 12 used in a coded-aperture imaging system to encode the three-dimensional spatial distribution of a radiation source onto a detecting medium and thereafter decode the same for display in a useful format. The scintillation camera 12 detects rays which emanate from a radioactive material distributed within an organ 14 of a patient's body. The rays emitted by the organ 14 are modulated by the attenuation zone plate 10, as further described below, and an encoded image of the three-dimensional distribution of the radiation in the organ 14 is projected onto a scintillation crystal 16. Radiation emitted from a point within the body organ 14 at angles falling within the field of view of the scintillation camera 12 are modulated by the configuration of the radiation attenuating pattern of the zone plate 10 and strike the crystal 16. The rays impinging on the crystal 16 cause scintillation events which are detected by a plurality of photodetectors 18 arranged to view overlapping areas of the crystal 16. The compilation of events occurring on the crystal 16 in response to radiation emanating from each point 20 on the body organ 14 is called the "shadow" and is the encoded record of the point 20 on the detecting medium 16. A similar series of scintillation events occurs on the crystal 16 in response to rays emitted from other points on the body organ 14 such as the second point 20' (FIG. 1).

Electrical signals developed by the photodetectors 18 in response to the scintillation events occurring in the crystal 16 deliver the point-response function information on the spatial distribution of the points 20, 20', etc. of the body organ 14 to detection and decoding circuitry 22, where the encoded record may be decoded to produce a final image, such as for example by cross-correlation techniques described in the Dowdey, et al. article referenced above. The complete three-dimensional information derived from the foregoing coded-aperture imaging process is then converted into useful format, such as in the form of a series of continuous tomographic slices displayed on a cathode ray tube 24.

The attenuation zone plate 10 comprises a radiation transmitting housing 26 made of an easily formable radiation transmitting material, such as acrylic plastic. The housing 26 is formed to provide a fluid chamber 28, shaped to contain a quantity of fluid radiation attenuating material 30 therein. Rays passing from points 20, 20', etc. of the body organ 14 through the attenuation zone plate 10 toward the crystal 16 (FIG. 1) pass through the radiation transmitting housing 26 and are attenuated by the fluid material 30 contained within the fluid chamber 28. The fluid chamber 28 is shaped in the configuration of a radiation attenuating pattern for modulating the rays emitted from the radiation source 14 according to their spatial origin. The pattern controls the shadow casting during the coded-aperture imaging process, i.e. the encoding of the radiation source 14 distribution onto the detecting medium 16.

As the rays pass from the body organ 14 through the attenuation zone plate 10 to the crystal 16, they are attenuated by the fluid material 30 in accordance with the thickness of the material that is encountered. The attenuation due to the walls of the radiation transmitting housing 26 is minimal. The preferred fluid material 30 is mercury. Mercury has a radiation attenuation coefficient approximately equal to that of lead and has the advantageous characteristic that it is a liquid at room temperature and thus will conform to the shape of the fluid chamber 28. As radiation travels from the body object 14 through the attenuation zone plate 10 toward the crystal 16, the amount of attenuation of the rays will be proportional to the thickness of the mercury through which the rays travel. The shape of the housing 26 of the attenuation zone plate 10 is selected according to the desired modulation. The housing 26, for example, can be shaped as shown schematically in FIG. 1 to provide a fluid chamber 28 which when filled with the fluid material 30 presents a radiation attenuating pattern in the form of a Fresnel zone plate like that discussed in the Dowdey, et al. article referenced above. Such a sinusoidal-shaped pattern configuration is illustrated schematically in FIG. 1.

A preferred embodiment of attenuation zone plate 10, particularly useful in testing and calibrating coded-aperture imaging systems, is the wedge-shaped attenuation zone plate shown in FIGS. 2 and 3.

The housing 26 of the zone plate 10 (FIGS. 2 and 3) comprises a plastic cover 32 fastened by means of countersunk screws 34 and washers 35 to a plastic bottom frame 36. A wedge-shaped fluid chamber 28 is formed between a graded central recessed portion 38 milled out of the underside of the cover 32 and the top surface 40 of the bottom frame 36. A reservoir cavity 42 is located at the left end (FIG. 3) of the fluid chamber 28 and a relief cavity 44 is located at the right end (FIG. 3) of the chamber 28. A filling port 46 connects the reservoir cavity 42 to the top surface of the cover 32.

The cover 32 is formed from a single rectangular-shaped piece of acrylic plastic material, such as Lucite, a trademark and product of the Dupont Corporation. The central recessed portion 38 is milled out of the underside of the cover 32 to provide the upper surface of the wedge portion of the fluid chamber 28. A rectangular region 48 is hollowed out of the center of the top surface of the cover 32 so that the thickness of the cover 32 above the wedge-shaped portion of the fluid chamber 28 is relatively thin and uniform, i.e. the bottom of the rectangular portion 48 is parallel with the underside of the cover 32 in the central recessed portion 38. After removal of the rectangular area 48 of the cover 32, a raised perimeter wall portion 50 of constant thickness greater than the rest of the cover 32 remains. The raised wall portion 50 is covered with a radiation blocking material, such as with thin sheets of lead 52, to provide a field of view defining mask for the attenuation zone plate 10. The lead sheets are suitably attached to the upper surface of the perimeter walls 50 of the cover 32 by means of removable screws 54 and washers 55.

The bottom frame 36 is likewise formed from a single rectangular-shaped piece of acrylic plastic material, such as Lucite. Though, as shown in FIG. 3, the wedge-shaped portion of the fluid chamber 28 is formed by milling out a portion 38 of the underside of the plastic cover 32, it will be appreciated that this portion of the fluid chamber 28 could likewise be formed by milling out a portion of the top surface of the bottom frame 36, or by milling out portions of both the top surface of the bottom frame 36 and the underside of the cover 32.

The reservoir cavity 42 is formed by hollowing out a portion of the wall 50 of the cover 32 to the left (FIG. 3) of the wedge portion of the fluid chamber 28. A corresponding smaller portion of the upper surface of the bottom frame 36 is likewise removed to form the base of the cavity 42 in the assembled structure. The filling port 46 provided to connect the top of the reservoir cavity 42 to the exterior of the housing 26 provides means by which the fluid material 30 can be introduced into the fluid chamber 28. Introduction of the fluid 30 into the chamber 28 is further facilitated by the relief cavity 44 which is formed by drilling a vertical bore through the wall 50 of the cover 32 to the right (FIG. 3) of the wedge portion of the fluid chamber 28, with the bore extending partly into the corresponding position of the top surface of the bottom frame 36. The filling port 46 and the bored relief cavity 44 are internally threaded to receive mating removable screws 56 and washers 57 which seal the filling port 46 and the top opening of the relief cavity 44, respectively. The preferred mercury fluid material 30 is introduced into the fluid chamber 28 by a filling procedure similar to that described for filling the mercury bar phantom device described in the commonly-owned, copending patent application Ser. No. 234,656 of W. Guth, entitled "Test Pattern Device for Radiation Detector and Method of Manufacture", filed Feb. 17, 1981, now U.S. Pat. No. 4,419,577.

To prevent leaking of the fluid material 30 from the fluid chamber 28 at the juncture of the underside of the cover 32 with the upper surface of the bottom frame 36, a peripheral groove 58 (see FIG. 3) is cut around the perimeter of the housing 26 at the juncture of the cover 32 and the bottom frame 36. A sealant (a suitable epoxy, glue or other caulking or sealing material) 60 is applied to fill the groove.

A calibrating plate 62 (FIG. 2) is advantageously provided laterally of the housing 26. This can be conveniently done by gluing one edge of the calibrating plate 62 to an edge of the wedge zone plate 10. The calibrating plate 62 is made of the same material as the cover 32 and bottom frame 36 and has a thickness equal to the sum of the thicknesses of the portions of the cover 32 and bottom frame 36 which define the wedge portion of the fluid chamber 28. The calibrating plate 62 serves as a guide to calibrate the coded-aperture imaging system so that attenuation due to the radiation exposed parts of the cover 32 and the bottom frame 36 of the wedge 10 can be compensated for or otherwise taken into consideration.

Figure 4:
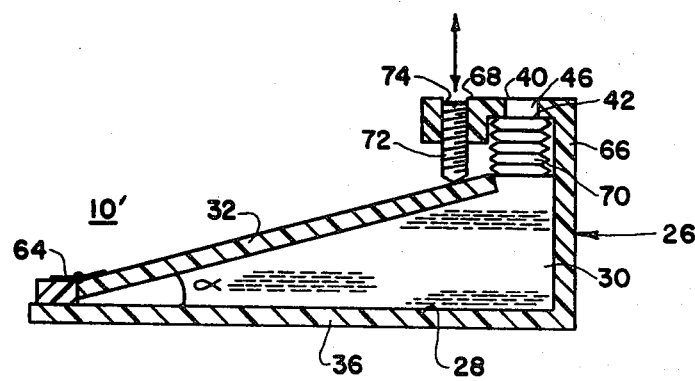
FIG. 4 is a section view (corresponding to the section view of FIG. 3) of a modified form of the plate of FIG. 2.

A modified form of attenuation zone plate in accordance with the present invention is shown by the zone plate 10' in FIG. 4. The housing 26 of the attenuation wedge 10' has a plastic cover 32 pivotally fastened at one end thereof by means of a hinge 64 to a plastic bottom frame 36. A right-hand rigid wall 66 and front and back flexible walls (not shown) connecting the edges of the cover 32 and the hinge 64 define the boundaries of the fluid chamber 28. A quantity of mercury 30 completely fills the wedge-shaped cavity portion of the fluid chamber 28, providing a wedge configuration for the radiation attenuating pattern.

The rigid wall 66 extends upwards beyond the right-hand edge of the cover 32. A transverse support piece 68 extends outwardly from the top of the wall 66 over the right-hand edge of the cover 32. A bellows 70 open at upper and lower ends is attached to the support piece 68 and extends to fill the gap between the cover 32 and the wall 66. The bellows 70 defines a fluid reservoir cavity 42 at the right-hand end (FIG. 4) of the wedge-shaped fluid chamber 28.

The bellows 70 is made of a flexible elastic material, such as rubber. The top of the bellows 70 is fixedly attached to the support piece 68 and the bottom of the bellows 70 is attached for vertical movement with the right-hand edge of the cover 32. Means, such as a vertically moveable plunger 72, is provided for changing the shape of the housing 26 to vary the configuration of the pattern of the attenuation zone plate 10'.

As shown in FIG. 4, the plunger 72 is in the form of a threaded screw which is received within an internally threaded bore 74 of the support piece 68. When the plunger 72 is moved down against the top of the cover 32, the cover 32 pivots about the hinge 64 toward the bottom frame 36, thereby changing the dimensions of the fluid chamber 28 and thus varying the configuration of the radiation attenuation pattern formed by the mercury 30 contained within the fluid chamber 28. When the plunger 72 moves downward, the internal angle α (FIG. 4) of the wedge is changed. Since the bellows 70 is elastic, it exerts an upward biasing force on the right-hand edge of the cover 32. Thus, when the plunger 72 is moved upwards, the cover 32 pivots about the hinge 64 away from the bottom frame 36 until the bellows 70 returns to its normal position.

The reservoir cavity 42 defined by the bellows 70 is formed with openings at its top and bottom (FIG. 4) so that a filling port 46 formed in the support piece 68 connects the fluid chamber 28 to the exterior of the housing 26. The filling port 46 may be provided with a removable closure, such as described above in connection with the attenuation zone plate 10 (FIGS. 2 and 3). The reservoir cavity 42 serves to supply additional fluid material 30 to the fluid chamber 28 when the plunger 72 is moved up, increasing the interior volume of the wedge. The cavity 42 also serves to receive unneeded fluid material 30 when the volume of the wedge portion of the fluid chamber 28 is decreased because the plunger 72 is moved down.

The cavity 42 also serves to accommodate increases and decreases in the volume of mercury 30 caused by increases and decreases in temperature. The dimensions of the reservoir cavity 42 should thus be chosen and the quantity of mercury 30 introduced into the fluid chamber 28 should be sufficient so that the wedge-shaped portion of the fluid chamber 28 remains completely filled at the lowest anticipated operating temperature, yet the mercury 30 does not spill out the filling port 46 at the highest anticipated operating temperature.

Figure 5:
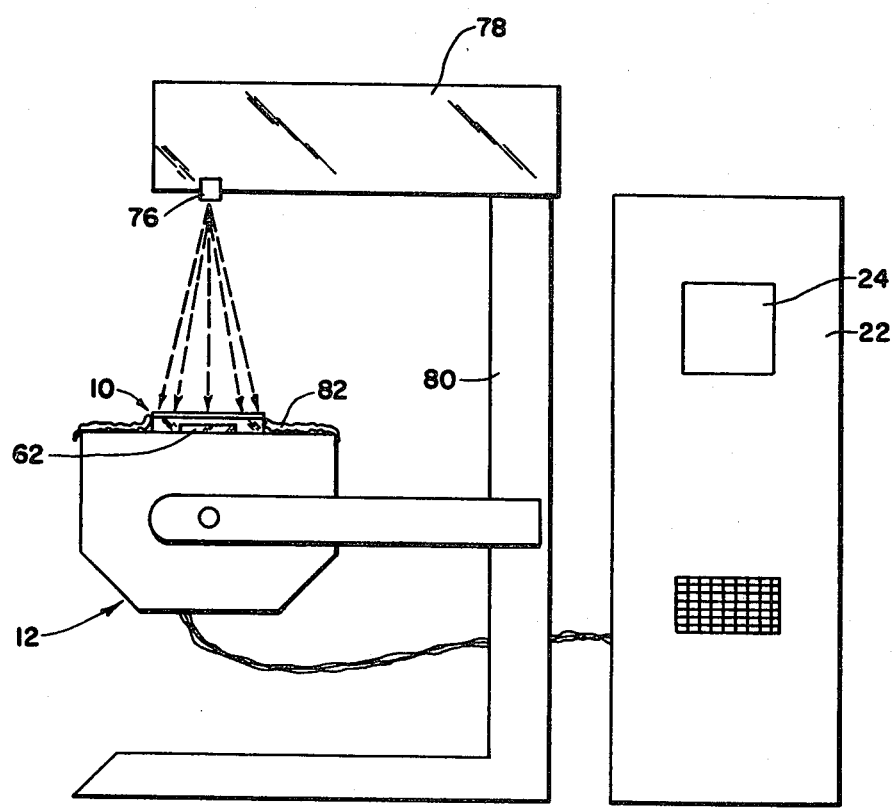
FIG. 5 is a schematic representation of a testing arrangement utilizing the plate of FIG. 2.

FIG. 5 shows a setup for testing the coded-aperture imaging system using a coded aperture in the form of attenuation zone plate 10, discussed above in reference FIGS. 2 and 3. A known point radiation source 76, such as $Co^{57}$ having a radiation energy of 122 KeV, is mounted by means of a detachable plastic holder 78 onto the supporting frame 80 of the scintillation camera 12 at a position above the camera detector head. The zone plate 10 is positioned between the radiation source 76 and the crystal 16 (FIG. 1) of the camera 12. The detector head of the camera 12 is covered with a lead protection layer 82 to prevent rays emanating from the source 76 from reaching the crystal 16 except through the wedge 10 or the associated calibrating plate 62 (FIG. 2). Using the CRT oscilloscope display 24, the photodetectors 18 and other elements of the coded-aperture imaging system can be tested and calibrated, moving the wedge plate 10 in a systematic manner across the entire photomultiplier surface.

An example attenuation zone plate 10 constructed for testing purposes as described, has the following physical dimensions:

| Parameter | Dimensions |
| --- | --- |
| width | 2.2 inches |
| length | 10 ins. |
| ave. height | 1.1 ins. |
| ave. thickness of calibrating plate | 0.3 ins. |
| wedge portion of fluid chamber: | |
| min. height | 0.007 ins. |
| max. height | 0.076 ins. |
| hollowed out rectangular portion: | |
| width | 1 ins. |
| length | 7.66 ins. |
| wedge angle α | 26 mins. |

An attenuation zone plate in accordance with the invention provides a coded-aperture device which is readily manufactured with precision without the difficulties involved in the machining of lead. The use of a fluid radiation attenuating material rather than a solid material like lead provides greater flexibility in the ray modulating pattern configurations that are available. A housing made of plastic can be easily molded or machined to provide the desired pattern configuration specifications.

Having thus described the invention with particular reference to the preferred forms of attenuation zone plates, it will be obvious to those skilled in the art to which the invention pertains, after understanding the invention, that various changes and modifications may be made therein without departing from the spirit and scope of the invention as defined by the claims appended hereto. Positional references of certain elements shown in the drawings (such as "right-hand", "left-hand", etc.) have been made throughout the specification merely to facilitate the explanation of the preferred embodiments, and such positional references should not be viewed as limiting the position to which such elements may have in other embodiments. Similarly, it will be appreciated that the dimensions, shapes, materials and layout of the various elements may be varied to suit individual taste and requirements.

What is claimed is:

1. An attenuation zone plate for use in a coded aperture imaging system to encode the distribution of a radiation source onto a detecting medium, comprising:
   (a) a quantity of fluid radiation attenuating material;
   (b) a radiation transmitting housing shaped as a fluid chamber to contain the fluid material in the configuration of a radiation attenuating pattern for modulating rays emitted from the radiation source according to their spatial origin; and
   (c) means for selectively adjusting the shape of the fluid chamber as to vary the configuration of the pattern
wherein the fluid chamber is wedge-shaped and the adjusting means comprises means for varying the internal angle of the wedge.

2. An attenuation zone plate as defined in claim 1, wherein the fluid material comprises mercury.

3. An attenuation zone plate as defined in claim 2, wherein the housing comprises a plastic body formed to define a cavity to contain the mercury.

4. An attenuation zone plate as defined in claim 1, wherein the housing comprises a cover and a bottom frame; the cover being formed with a reservoir cavity and a relief cavity; at least one of the cover and the bottom frame being formed to have a central recessed portion; and the cover and the bottom frame being relatively positioned so as to form a fluid chamber which is defined by the reservoir cavity, the relief cavity and the recessed portion.

5. An attenuation zone plate as defined in claim 4, wherein the central recessed portion is a graded central recessed portion formed in the cover, the reservoir and relief cavities are formed at opposite ends of the graded central recessed portion, and the respective thicknesses of the cover and bottom frame are uniform across the portion of the fluid chamber defined by the graded central recessed portion of the cover and the corresponding portion of the bottom frame.

6. An attenuation zone plate as defined in claim 5, further comprising a calibrating plate connected to the housing, the calibrating plate being of the same material as the cover and the bottom frame and having a thickness equal to the sum of the uniform thicknesses of the cover and the bottom frame across said portion of the fluid chamber.

7. An attenuation zone plate as defined in claim 1, wherein the perimeter of the housing is covered with a radiation blocking material to provide a radiation absorbing mask which defines the useful field of view of the zone plate.

8. A coded-aperture imaging system including a scintillation camera having a crystal; a plurality of photodetectors arranged to view overlapping areas of the crystal; an attenuation zone plate positioned between a source of radiation and the crystal to encode the distribution of the radiation from the source; detection and decoding circuitry for calculating the spatial distribution of a source of radiation based on the receipt of signals from the photodetectors in response to radiation impinging on the crystal from a source; the attenuation zone plate comprising a quantity of fluid radiation attenuating material and a radiation transmitting housing shaped to contain the fluid material in the configuration of a radiation attenuating pattern for modulating rays emitted from the radiation source according to their spatial orgin, wherein the fluid material is mercury and wherein the housing pattern comprises an attenuating wedge.

9. A coded-aperture imaging system including a scintillation camera having a crystal; a plurality of photodetectors arranged to view overlapping areas of the crystal; an attenuation zone plate positioned between a source of radiation and the crystal to encode the distribution of the radiation from the source; detection and decoding circuitry for calculating the spatial distribution of a source of radiation based on the receipt of signals from the photodetectors in response to radiation impinging on the crystal from a source; the attenuation zone plate comprising a quantity of fluid radiation attenuating material and a radiation transmitting housing shaped to contain the fluid material in the configuration of a radiation attenuating pattern for modulating rays emitted from the radiation source according to their spatial orgin, wherein the housing comprises a cover and a bottom frame; the cover is formed with a reservoir cavity and a relief cavity; at least one of the cover and the bottom frame is formed with a central recessed portion; and the cover and the bottom frame are relatively positioned so as to form a wedge-shaped fluid chamber defined by the recessed portion, the reservoir cavity and the relief cavity.

10. An attenuation zone plate for use in a coded aperture imaging system to encode the distribution of a radiation source onto a detecting medium, comprising:
(a) a quantity of fluid radiation attenuating material;
(b) a radiation transmitting housing forming a wedge-shaped volume variable fluid chamber to contain the fluid material, said fluid chamber comprises
(b1) a wedge-shaped bottom frame;
(b2) a cover for the bottom frame which cover is pivotally fastened at one end to the bottom frame;
(b3) an elastic fluid reservoir cavity means attached between the bottom frame and the other end of the cover for supplying additional fluid radiation attenuating material to the fluid chamber when the interior volume of the fluid chamber increases and also for providing a biasing force for the other end of the pivotally fastened cover; and
(b4) means for pivoting the cover against the biasing force of the fluid reservoir cavity, thereby varying the internal angle and thus the interior volume of the wedge-shaped fluid chamber.

11. An attenuation zone plate as defined in claim 10, wherein the elastic fluid reservoir cavity comprises a bellows of flexible elastic material, which is open at its upper and lower ends.

12. An attenuation zone plate as defined in claim 10, wherein the pivoting means comprises a plunger which is mounted at the bottom frame such that it is vertically moveable against the pivotable cover.

* * * * *